UNITED STATES PATENT OFFICE.

JOSEPH W. BRODBECK AND CLARENCE J. BEEKLEY, OF CINCINNATI, OHIO, ASSIGNORS TO THE BRODBECK COMPANY, OF CINCINNATI, OHIO, A CORPORATION OF OHIO.

NURSERY-POWDER COMPOUND.

992,937.  Specification of Letters Patent.  Patented May 23, 1911.

No Drawing.  Application filed December 23, 1909.  Serial No. 534,614.

*To all whom it may concern:*

Be it known that we, JOSEPH W. BRODBECK and CLARENCE J. BEEKLEY, both citizens of the United States, and residents of Cincinnati, Hamilton county, State of Ohio, have invented a certain new and useful Nursery-Powder Compound; and we do declare the following to be a clear, full, and exact description of the invention.

This invention relates to powder compounds of the kind used externally and applied to the surface of the skin like some of the powder compounds now on the market and known as baby or nursery powders. The general object of these powders is to protect the surface of the skin, to induce the healing of sore and galled portions thereof, and to prevent the skin from becoming sore in consequence of moisture due to natural discharges in cases of the sick, children and babies, etc.

Powders now on the market have the inherent defect that moisture due to natural discharges washes them off and carries them quickly away, leaving the skin thereafter unprotected, the same as if no powder had been applied, thus utterly failing in the main object of their use.

We have discovered that stearic acid when combined with bases and derivatives of zinc and applied in powder-form to the surface of the skin, adheres readily thereto and forms a protective layer which is impervious to water and readily sheds moisture, urine for instance, in case of babies, without being carried away thereby, so that the skin remains perfectly dry. The most convenient form in which this substance may be obtained is the commercial stearate of zinc such as is purchasable in the markets. The effect of this substance is increased by addition to it of approximately an equal quantity of oxid of zinc in powder-form which is likewise insoluble in water and adds healing and antiseptic properties and in case of open sores has a cooling effect. It is not necessary that these substances be applied to the skin in their normal state and by preference they are combined with a suitable base which may serve as a vehicle, such as talcum-powder for instance, or its equivalent, and in proportions from about two and one half to three times as much as the two previously mentioned substances combined. To this mass we add a pure antiseptic, such as boracic acid and an astringent such as salicylic acid or their equivalents. This entire mass is now thoroughly intermixed to form an impalpable powder to which a suitable perfume may be added.

As before stated the stearate of zinc assisted by the oxid of zinc forms a moistureproof coating which, by adhering to the skin, protects the same and maintains it in a dry state. In cases where the skin is sore, galled or open, the healing process is induced and favored by the presence of the astringent medium which is salicylic acid which also tends to dry up discharging sores, the healing action proceeding under the protection due to the presence of the antiseptic medium which is boracic acid.

A preferable composition as to proportion consists of stearate of zinc, oxid of zinc and boracic acid, each in equal quantity and combined with about double their combined quantity of the vehicle which is used and which, as before stated, is talcum powder. To this is added a small quantity of salicylic acid, about from one half to one per cent. of the entire mixture.

While this powder when applied to the skin forms a protective layer which is moisture-proof, it may nevertheless be readily removed and washed off with water when soap is added.

Having described our invention, we claim as new:

1. A powder compound of the kind and for the purpose stated and consisting of stearate of zinc and of oxid of zinc to which is added a suitable astringent and a suitable antiseptic, all in powder form, the whole combined with talcum-powder.

2. A powder compound of the kind and for the purpose stated and consisting of approximately one part of stearate of zinc, one part of oxid of zinc, one part of boracic acid, substantially six parts of talcum-powder and a quantity of salicylic acid equal to from one half to one per cent. of the entire compound.

In testimony whereof, we hereunto affix our signatures in the presence of two witnesses.

JOSEPH W. BRODBECK.
CLARENCE J. BEEKLEY.

Witnesses:
C. SPENGEL,
T. LE BEAU.